United States Patent [19]
Kim et al.

[11] Patent Number: 5,583,724
[45] Date of Patent: Dec. 10, 1996

[54] MAGNETIC LATCHING APPARATUS FOR AN ACTUATOR OF A HARD DISK DRIVE

[75] Inventors: Sung-Wook Kim; Yun-Chong Hwang, both of Seoul, Rep. of Korea

[73] Assignee: SamSung Electronics Co., Ltd., Suwon, Rep. of Korea

[21] Appl. No.: 434,310

[22] Filed: May 2, 1995

[30] Foreign Application Priority Data

Oct. 17, 1994 [KR]  Rep. of Korea ................. 26495/1994

[51] Int. Cl.$^6$ ................................................. G11B 21/22
[52] U.S. Cl. ............................................................ 360/105
[58] Field of Search ........................... 360/97.02, 97.01, 360/105

[56] References Cited

U.S. PATENT DOCUMENTS

| | | | |
|---|---|---|---|
| 5,003,422 | 3/1991 | Sun et al. | 360/105 |
| 5,023,736 | 6/1991 | Kelsic et al. | 360/105 |
| 5,189,576 | 2/1993 | Morehouse et al. | 360/105 |
| 5,224,000 | 6/1993 | Casey et al. | 360/105 |
| 5,231,556 | 7/1993 | Blanks | 360/105 |
| 5,270,887 | 12/1993 | Edwards et al. | 360/97.03 |
| 5,274,288 | 12/1993 | Stefansky | 360/99.08 |
| 5,448,435 | 9/1995 | Nakasawa et al. | 360/105 |

*Primary Examiner*—John H. Wolff
*Attorney, Agent, or Firm*—Robert E. Bushnell, Esq.

[57] ABSTRACT

The invention relates to a magnetic actuator latching apparatus in a hard disk drive, for maintaining the actuator of the hard disk drive in a parking zone while the actuator is not in operation. A magnetic actuator latching apparatus of a hard disk drive comprises a latching screw installed at the voice coil end of an actuator, which is easily latched by a permanent magnet, in order that a head of the actuator is positioned in a parking zone of a disk so that data recorded on a disk can be safely protected while said hard disk drive is not in operation. The permanent magnet attracts the latching screw through a magnetic force and then enables the head of the actuator to be positioned on the parking zone, upon the power-off of said hard disk drive. A damper, which houses the permanent magnet, buffers a shock or an impact resulting from being contacted with the latching screw. A latch assembly has a damper inserting part for receiving the damper and a plate extending from the damper inserting part. A lower yoke, which supports a magnet over which the voice coil of the actuator passes, has a lug extending upward to receive a lug inserting hole in the plate of the latch assembly so the latch assembly can be attached to the lower yoke. The lower yoke also has a supporting member assembly hole aligned with a supporting member passing hole of the plate of the latch assembly. A supporting member has a peg extending therefrom which is passed through the supporting member passing hole and fit into the supporting member assembly hole so that the latch assembly is fixedly attached to the lower yoke.

16 Claims, 3 Drawing Sheets

MAGNETIC LATCHING APPARATUS FOR AN ACTUATOR OF A HARD DISK DRIVE

CROSS-REFERENCE TO RELATED APPLICATIONS

This application makes reference to, incorporates herein and claims all benefits accruing under 35 U.S.C. §119 from our patent application entitled *Actuator Fixing Apparatus Of Hard Disk Drive*, earlier filed in the Korean Industrial Property Office on the 17th of October 1994 and there assigned Ser. No. 26495/1994.

BACKGROUND OF THE INVENTION

The present invention relates to a hard disk drive used as an auxiliary memory device in a computer, and more particularly, to a magnetic latching apparatus for an actuator of the hard disk drive for maintaining the actuator of the hard disk drive in a parking zone while the actuator is not in operation.

Generally, the hard disk drive used as the auxiliary memory device in the computer includes a disk which is rotated at a high speed by spindle motor, and an actuator which rotates in response to a voice coil motor about a pivot point for moving a magnetic head that writes data onto tracks of the disk and reads data recorded on tracks of the disk. The magnetic head is located on a leading end of a head gimbals, which moves along both sides of the disk, wherein the magnetic head is influenced by an airflow generated on a surface of the disk as the disk rotates at a high speed to maintain a minute air gap between the magnetic head and the disk.

When the hard disk drive stops or powers off during the above-mentioned operation, the actuator is installed to move the magnetic head into a parking zone located on an inner or an outer portion in the tracks of the disk. Upon the power-off of the hard disk drive, the actuator is adjusted to move the magnetic heads into the parking zone on the disk by a residual inertia of a spindle motor. This is designed to prevent the data recorded on the disk from being damaged due to undesired contact of the magnetic head against the surface of the disk.

For stably fixing or latching a rear end of the actuator during the above operation, a method such as a solenoid, a separate voice coil motor or a magnetic latch has been employed. Among these methods, the magnetic latch is generally used. In this case, a metal plate easily attached to a magnet has to be installed to the rear end of the actuator, since the rear end of the actuator is of an aluminum material, or has a structure to which a coil is attached. Generally, in the case where the structure having the metal plate is used, the metal plate can be attached to the rear end of the actuator by using an adhesive material. However, when the adhesive material is used within the hard disk drive, there are disadvantages that a gas generated during the time it takes the adhesive material to solidify and a dust generated due to a change of an element of the adhesive material over time have a bad effect on the reliability of the hard disk drive.

A conventional electric fixing method, that uses the solenoid or the separate voice coil motor, requires an additional device for controlling these means. But, this results in another problem that the cost of product is accordingly risen due to a high price of the device.

U.S. Pat. No. 5,189,576 entitled ROTARY INERTIAL LATCH FOR DISK DRIVE ACTUATOR to James H. Morehouse, et al. discloses a mechanical latch responsive to an inertial force of the actuator for moving a latch pin to engage a finger extending from the actuator for maintaining the actuator in its proper position when the disk drive is not in operation.

In the case of using the conventional magnetic latch, there are disadvantages that since a complicated device using a damper or a spring to buffer impact generated upon the parking of head is used, the cost of product is accordingly risen, and difficulties of assembly and repair are caused.

John B. Blanks discloses in U.S. Pat. No. 5,231,556 a SELF-HOLDING LATCH ASSEMBLY comprising a magnetic latch assembly mounted on a magnet coil assembly that rotates about a pivot pin to confine a latch pin, which extends from the side of an actuator by a latch pin arm, between a latch arm of the magnetic latch assembly and a travel stop, thereby locking the actuator in a parking zone.

U.S. Pat. No. 5,224,000 entitled CRASH STOP AND MAGNETIC LATCH FOR A VOICE COIL ACTUATOR by Shawn E. Casey, et al. discloses a magnetic latch for holding an actuator in a "home" (park) position, wherein the magnetic latch comprises a pair of magnetic "L" shaped slidable poles disposed on opposite sides of a magnet, wherein the poles are of a greater length than the magnet so that a steel strike plate attached to the actuator contacts the poles to prevent the strike plate from hitting the magnet. The magnetic latch is slidably mounted in a recess of a bumper pad disposed within a frame of a bumper stop mounted on the lower casing of the housing such that the poles extend beyond a contact surface of the bumper pad.

U.S. Pat. No. 5,023,736 entitled MAGNETIC LATCH FOR DISK DRIVE ACTUATOR by Gary Kelsic, et al. discloses a magnetic latch having a pair of spaced apart parallel poles extending from a magnet for latching onto a latch plate extending from a disk drive actuator for maintaining the actuator in a "crash stop" (park) position when desired. The magnetic latch is housed in a cavity of a molded plastic housing attached to the disk drive housing.

Kai C. K. Sun, et al. discloses in U.S. Pat. No. 5,003,422 a MAGNETIC LOCKING MECHANISM, i.e., a magnetic latch, having a resilient mechanism connected to a support structure for dampening the impact of the actuator as an actuator pin extending from the actuator strikes a swing plate of the resilient mechanism. Movement of the swing plate causes the top of the swing plate to move against the resistance of a spring in response to the bottom of the swing plate being struck by the actuator. A magnet attached to the bottom of the swing plate latches onto an actuator pin extending from the actuator when the actuator is placed in park.

SUMMARY OF THE INVENTION

It is an object of the present invention to provide an actuator latching apparatus of a hard disk drive which does not require an adhesive material in order to be installed in the hard disk drive.

It is another object of the invention to provide an actuator latching apparatus of a hard disk drive which can be constructed in a simple assembling manner.

To attain these and other objects, a hard disk drive according to the present invention is provided, in which a permanent magnet, which is used for latching a latching screw attached to the voice coil end of the actuator in the hard disk drive, is assembled in a latch assembly, the permanent magnet being covered with a damping material made of rubber. The latching screw is mounted in a screw groove formed in a part of the voice coil end of the actuator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 3:
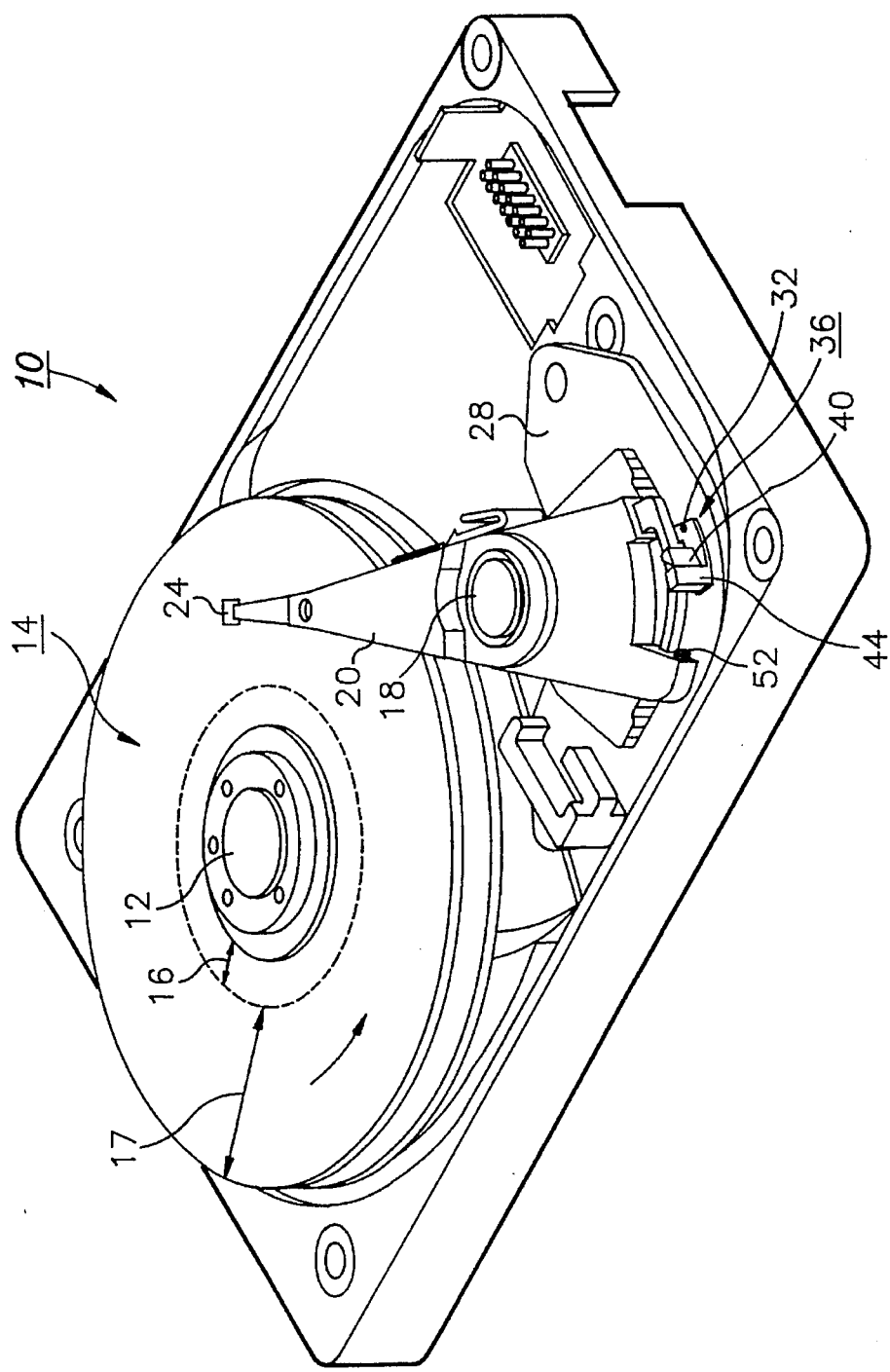
FIG. 3 is a assembled perspective view illustrating assembly of the magnetic actuator latching apparatus in the hard disk drive according to the present invention.

A hard disk drive in the present invention, as shown in FIG. 3, includes a disk 14 that rotates at a high speed by a spindle motor 12 placed in a central portion thereof. An actuator 20 is rotatably installed about a pivot 18, above a surface of the disk 14, and head gimbals having a magnetic head 24 are provided at the head end of the actuator 20. The disk 14 includes a data zone 17 where data is recorded or read, and a parking zone 16 where the magnetic head 24 is safely positioned while hard disk drive is not in operation. A bobbin and a coil combination, which constitute a voice coil motor 21, are provided at the voice coil end of the actuator 20.

Figure 1:
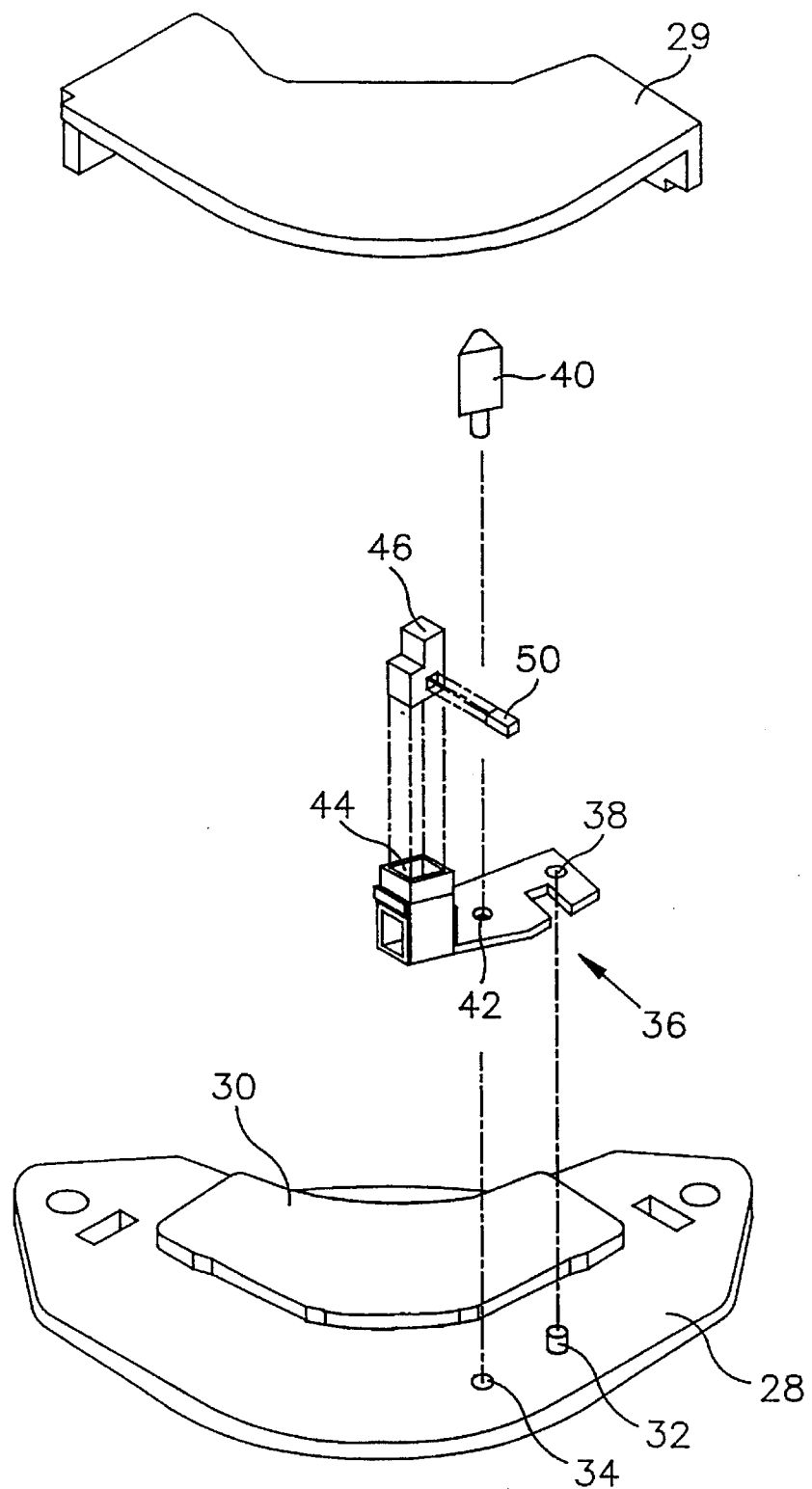
FIG. 1 is an exploded perspective view illustrating a magnetic actuator latching apparatus in a hard disk drive according to the present invention.

In the meanwhile, the voice coil motor moves between a lower yoke 28, FIG. 1, having a permanent magnet 30 mounted thereon, and an upper yoke 29 also having a permanent magnet (not shown) mounted thereon, which are separated by a given distance to each other. The lower yoke 28 is attached to the lower body portion of the hard disk drive.

Figure 2:
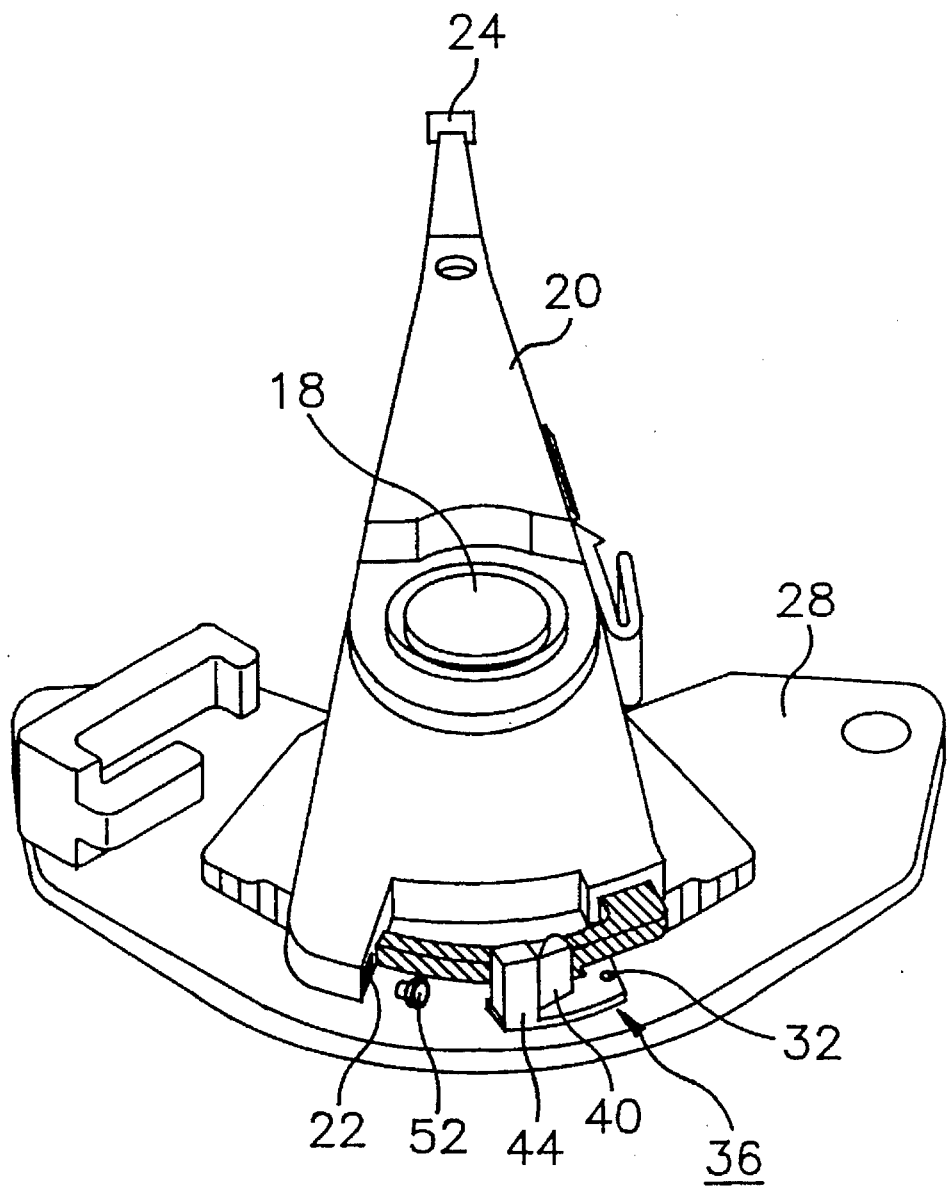
FIG. 2 is a perspective view illustrating a metal plate and its assembly part of the actuator in relation to the mounted magnetic actuator latching apparatus according to the present invention.

The voice coil end of the actuator 20 has a portion thereof removed, FIG. 2, to provide an extension having a screw groove 22 formed to receive latching screw 52 which is easily latched by latch assembly 36 when the head 24 is moved to parking zone 16.

The latching screw 52 is comprised of two ends having different size with each other. The small end forms a male screw thread to be received to the metal plate assembly part 22.

As shown in FIG. 1, latch assembly 36, which attracts the latching screw 52 through a magnetic force and thus enables the magnetic head 24 of the actuator 20 to be positioned on the parking zone 16 upon de-energization of hard disk drive 10, has a "L" shape. Latch assembly 36 comprises a damper inserting part 44 having a boxed shape, which has an upper opening at an upper portion thereof, provided at one side of the latch assembly 36, to receive a damper 46 having an opening therein in which the permanent magnet 50 is inserted. A side of the damper inserting part 44 includes a side opening through which one side of the damper 46 can protrude, so that the latching screw 52 can be contacted with the damper 46. The other side of the latch assembly 36 includes plate, extending from the damper inserting part 44, having a lug inserting hole 38 to receive a lug 32 extending upward from lower yoke 28, and a supporting member passing hole 42 for enabling the latch assembly 36 to be attached to the lower yoke 28.

The damper 46 having the permanent magnet 50 is of an appropriate material such as, for example, rubber for buffering a shock or an impact resulting from being contacted with the latching screw 52.

Moreover, the lower yoke 28 includes the preset size of lug 32 to be inserted into the lug inserting hole 38 in the latch assembly 36, and a supporting member assembly hole 34 aligned with the supporting member passing hole 42 in the latch assembly 36 to enable the latch assembly 36 to be attached to the lower yoke 28.

For securing the latch assembly 36 to the lower yoke 28, a supporting member 40 is tightly received into the supporting member assembly hole 34 in the lower yoke 28, through the supporting member hole 42 in the latch assembly 36. And as shown in FIG. 1, the supporting member 40 is comprised of a lower portion formed as a peg to be received into the supporting member passing hole 42 in the latch assembly 36 and into the supporting member assembly hole 34 in the lower yoke 28, and an upper portion of a larger size than the bottom portion, thereby preventing the latch assembly 36 from being rotated around lug 32 when latching screw 52 contacts damper 46.

In a magnetic actuator latching apparatus of the hard disk drive 10 according to the present invention constructed as above mentioned, as shown in FIG. 1, the damper 46 having the permanent magnet 50 passes through the upper opening of the damper inserting part 44 in the latch assembly 36 and then, the one side of the damper 46 is disposed at the side opening of the damper inserting part 44. In addition, the lug inserting hole 38 in the latch assembly 36 is passed over lug 32 in the lower yoke 28, and the peg of the supporting member 40 passes through the supporting member passing hole in the latch assembly 36 and is tightly received into the supporting member assembly hole 34 in the lower yoke 28, thereby rendering the latch assembly 36 to be fixed to the lower yoke 28.

Further, as shown in FIG. 2, a portion of the voice coil end of the actuator 20 which houses of the voice coil 21 is removed to leave a portion of the voice coil 21 exposed. The most rearward portion of the remaining portion of the voice coil end of the actuator 20 which houses of the voice coil 21 has a screw groove 22 formed in a side thereof. The latching screw 52 is assembled in the screw groove 22 in the voice coil end of actuator 20.

In the magnetic actuator latching apparatus constructed according to the principles of the present invention, and as shown in FIG. 3, when power, such as an electric signal, is applied in the hard disk drive 10 and the disk 14 rotates in a given direction by operation of the spindle motor 12, the magnetic head 24, positioned in the parking zone 16 of disk 14, floats up while maintaining a given height by an air flow generated by the rotating surface of the disk 14. At this time, the latching screw 52 of the actuator, which is in contact with the damper 46 by a magnetic force of the permanent magnet 50 in the latch assembly 36, is separated by a driving force of the voice coil motor 21. And then, the actuator 20 rotates about a pivot 18, so that the magnetic head 24 can be moved into a desired position of the data zone 17 of disk 14.

To the contrary, when the hard disk drive 10 the power removed (power off), the disk 14 rotates counterclockwise as its rotating speed is reduced by the inertia. Then, the magnetic head 24 of the actuator 20 is safely positioned on the parking zone located on the inner most portion of the disk 14. At this time, the latching screw 52 is attached to the permanent magnet 50, thus safely maintaining the non-operation state of the hard disk drive 10.

As above described, the magnetic actuator latching apparatus of the hard disk drive constructed according to the present invention provides such advantages that generation of gas and dust therein is suppressed, since the assembly of the magnetic actuator latching apparatus is possible without having a bond such as an adhesive material, and the cost of production can be lowered by easiness of assembly and separation in comparison with that in using a solenoid or a voice coil motor.

What is claimed is:

1. A magnetic latching apparatus of a hard disk drive having upper and lower yokes between which a voice coil motor at a voice coil end of an actuator is disposed to be moved in order to position a magnetic head attached to a head end of the actuator over a desired position of a hard disk, said magnetic latching apparatus comprising:

latch assembly means having a boxed end portion and a plate end portion, said boxed end portion having an upper opening and a side opening therein, and said plate end portion having therein a lug inserting hole and a supporting member passing hole, said lug inserting hole receiving a lug extending upward from said lower yoke, and said supporting member passing hole being aligned with a support member assembly hole formed in said lower yoke;

damper means having a magnet inserted therein, said damper means being inserted through said upper opening of said boxed end portion of said latch assembly means so that a side portion of said damper means is adjacent said side opening of said boxed end portion of said latch assembly means;

supporting means having a peg end for insertion through said supporting member passing hole and fit into said support member assembly hole formed for fixedly attaching said latch assembly to said lower yoke; and a latching screw attached to a portion of said voice coil end of said actuator, said latching screw being latched by said magnet when said disk drive is in a power-off operating condition.

2. The magnetic latching apparatus as set forth in claim 1, wherein said portion of said voice coil end of said actuator comprises a threaded groove for receiving said latching screw, said latching screw having a screw thread to be threadingly received into said threaded groove.

3. The magnetic latching apparatus as set forth in claim 1, wherein said damper means being comprised of a flexible rubber and having an opening therein for receiving said magnet.

4. The magnetic latching apparatus as set forth in claim 1, comprising said supporting means comprises an upper portion extending above said peg end, said upper portion of said supporting means being larger than said peg end.

5. A magnetic latching apparatus of a hard disk drive having upper and lower yokes each having a permanent magnet mounted thereon between which a voice coil motor at a voice coil end of an actuator is disposed to be moved in order to position a magnetic head attached to a head end of the actuator over a desired position of a hard disk, said magnetic latching apparatus comprising:

latch assembly means having a first and second ends, said latch assembly having a first hole in said second end for attaching said latch assembly means to said lower yoke;

damper means having a magnet inserted therein, said damper means being attached to said first end of said latch assembly means;

supporting means having a small end and a large end, said small end being inserted through a second hole in said second end of said latch assembly means to be fixedly attached to said lower yoke; and latching means attached to a portion of said voice coil end of said actuator, said latching means being latched by said magnet when said disk drive is in a parked condition.

6. The magnetic latching apparatus as set forth in claim 5, wherein first end of said latch assembly means comprises a boxed end portion and said second end of said latch assembly means comprises a plate end portion having said first and second holes therein, said boxed end portion having an upper opening and a side opening therein.

7. The magnetic latching apparatus as set forth in claim 6, said first hole in said plate end portion comprises a lug inserting hole and said second hole in said plate end portion comprises a supporting member passing hole, said lug inserting hole receiving a lug extending upward from said lower yoke for attaching said plate assembly means to said lower yoke.

8. The magnetic latching apparatus as set forth in claim 7, wherein said support member passing hole is aligned with a support member assembly hole in said lower yoke.

9. The magnetic latching apparatus as set forth in claim 8, said small end of said supporting means having a peg shape for passing through said supporting member passing hole and fit into said support member assembly hole formed in said lower yoke for fixedly attaching said latch assembly means to said lower yoke.

10. The magnetic latching apparatus as set forth in claim 6, said damper means being inserted through said upper opening of said boxed end portion of said latch assembly means so that a side portion of said damper means protrudes into said side opening of said boxed end portion of said latch assembly means, said damper means being comprised of a flexible rubber.

11. The magnetic latching apparatus as set forth in claim 9, said damper means being inserted through said upper opening of said boxed end portion of said latch assembly means so that a side portion of said damper means protrudes into said side opening of said boxed end portion of said latch assembly means.

12. The magnetic latching apparatus as set forth in claim 11, said voice coil end of said actuator having a cut away section for exposing a first portion of said voice coil motor and a housing section for housing a second portion of said voice coil motor.

13. The magnetic latching apparatus as set forth in claim 12, a most rearward portion of said housing section of said voice coil end of said actuator having a side section through which said voice coil motor passes, said side section having a threaded groove formed therein.

14. The magnetic latching apparatus as set forth in claim 11, said damper means being comprised of a flexible rubber and having an opening therein for receiving said magnet.

15. The magnetic latching apparatus as set forth in claim 13, said latching means comprising a latching screw having a threaded end inserted in said threaded groove, said latching screw being latched by said magnet when said disk drive is in a parked condition.

16. The magnetic latching apparatus as set forth in claim 5, said damper means being comprised of a flexible rubber and having an opening therein for receiving said magnet.

\* \* \* \* \*